US012328697B1

(12) United States Patent
Kos et al.

(10) Patent No.: US 12,328,697 B1
(45) Date of Patent: Jun. 10, 2025

(54) SYSTEM AND METHOD OF WIRELESS SYNCHRONIZATION OF MACHINERY MONITORING COMPONENTS

(71) Applicant: Windrock, Inc., Knoxville, TN (US)

(72) Inventors: Marek Kos, Knoxville, TN (US); Jacob Cross, Knoxville, TN (US); Michael Evans, Knoxville, TN (US)

(73) Assignee: Windrock, Inc., Knoxville, TN (US)

( * ) Notice: Subject to any disclaimer, the term of this patent is extended or adjusted under 35 U.S.C. 154(b) by 418 days.

(21) Appl. No.: 17/648,826

(22) Filed: Jan. 25, 2022

Related U.S. Application Data

(60) Provisional application No. 63/140,979, filed on Jan. 25, 2021.

(51) Int. Cl.
*H04W 56/00* (2009.01)
*H04W 4/38* (2018.01)
*H04W 4/40* (2018.01)

(52) U.S. Cl.
CPC ......... *H04W 56/0025* (2013.01); *H04W 4/38* (2018.02); *H04W 4/40* (2018.02); *H04W 56/002* (2013.01)

(58) Field of Classification Search
None
See application file for complete search history.

(56) References Cited

U.S. PATENT DOCUMENTS

| | | | |
|---|---|---|---|
| 5,152,172 A | 10/1992 | Leon et al. | |
| 6,292,757 B1 | 9/2001 | Flanagan et al. | |
| 6,485,265 B2 | 11/2002 | Schroeder et al. | |
| 7,328,130 B2 | 2/2008 | Wiles et al. | |
| 7,403,850 B1 | 7/2008 | Boutin et al. | |
| 7,987,725 B2 | 8/2011 | Twerdochlib | |
| 8,522,750 B2 | 9/2013 | Flanagan et al. | |
| 8,660,110 B2 | 2/2014 | Zakrewski et al. | |
| 10,602,471 B2 | 3/2020 | Lin | |
| 10,732,150 B2 | 8/2020 | Flanagan | |
| 10,952,175 B2 | 3/2021 | Lin | |

(Continued)

FOREIGN PATENT DOCUMENTS

| | | | | |
|---|---|---|---|---|
| GB | 2527998 | 8/2020 | | |
| WO | WO-2006110960 A1 * | 10/2006 | ............ | H04J 3/0632 |

(Continued)

*Primary Examiner* — Jay L Vogel
(74) *Attorney, Agent, or Firm* — Robinson IP Law, PLLC

(57) ABSTRACT

A condition monitoring system for monitoring a condition of a piece of machinery includes: one or more sensor motes installable proximate to a piece of machinery, each of the one or more sensor motes including a housing, a microprocessor, an onboard precision clock in electronic communication with the microprocessor, and an antenna in electronic communication with the microprocessor; one or more sensor devices in wired electronic communication with the microprocessor of one of the one or more sensor motes, the one or more sensor devices in sensory contact with the piece of machinery; a gateway device including a microprocessor and one or more antennas in communication with the microprocessor. When the gateway device is within a wireless range of the one or more sensor motes the gateway device receives time stamped sensor data transmitted to the gateway device from the one or more sensor motes.

13 Claims, 6 Drawing Sheets

(56) References Cited

U.S. PATENT DOCUMENTS

| | | | |
|---|---|---|---|
| 2006/0137627 A1* | 6/2006 | Kim | F02B 77/089 374/E1.004 |
| 2009/0168808 A1 | 7/2009 | Cho et al. | |
| 2010/0220748 A1 | 9/2010 | Inomata | |
| 2011/0216658 A1 | 9/2011 | Etkin et al. | |
| 2011/0255528 A1 | 10/2011 | Zakrewski | |
| 2012/0330605 A1 | 12/2012 | Whitefield, II | |
| 2012/0330606 A1 | 12/2012 | Whitefield, II | |
| 2013/0304385 A1* | 11/2013 | Gillette, II | F02F 7/0068 702/6 |
| 2014/0081593 A1 | 3/2014 | Hess et al. | |
| 2014/0180605 A1 | 6/2014 | Richerson | |
| 2015/0120360 A1* | 4/2015 | Adriaenssens | G01V 8/10 705/7.16 |
| 2016/0266008 A1* | 9/2016 | Park | F02N 19/005 |
| 2016/0359872 A1* | 12/2016 | Yadav | H04L 63/1408 |
| 2018/0058415 A1* | 3/2018 | Lin | F02D 41/009 |
| 2018/0163711 A1 | 6/2018 | Follmar et al. | |
| 2018/0338192 A1 | 11/2018 | North et al. | |
| 2018/0363641 A1 | 12/2018 | Follmar et al. | |
| 2019/0108756 A1* | 4/2019 | Gillingham | G06F 21/31 |
| 2020/0154236 A1* | 5/2020 | Carbune | H04W 4/38 |
| 2022/0221293 A1* | 7/2022 | Hara | B60W 30/143 |

FOREIGN PATENT DOCUMENTS

| | | |
|---|---|---|
| WO | WO2014168937 | 10/2014 |
| WO | WO-2018225067 A1 * | 12/2018 |

* cited by examiner

SYSTEM AND METHOD OF WIRELESS SYNCHRONIZATION OF MACHINERY MONITORING COMPONENTS

CROSS-REFERENCE TO RELATED APPLICATION(S)

This application claims priority to and is a non-provisional of U.S. Provisional Patent Application Ser. No. 63/140,979 for a System and Method of Wireless Synchronization of Machinery Monitoring Components filed on Jan. 25, 2021, the contents of which are incorporated herein by reference in its entirety.

BACKGROUND AND FIELD

Various monitoring systems exist for monitoring machinery equipment. For example, reciprocating machinery may be monitored using various sensors capturing pressure, vibration and ultrasonic data collected with respect to phase or shaft angle alignment from the reciprocating machinery. Further, captured data from the sensors may be evaluated with other collected data.

Existing monitoring systems typically employ a wired connection between various sensory devices of the monitoring system to achieve an acceptable level of precision with respect to synchronization and alignment of data captured by the sensory devices. A wired connection has been required in existing monitoring systems installed on high-speed engines and compressors due to requirements for highly precise data collection. Wired connections are typically established between a variety of sensors including pressures sensors, accelerometers, and position sensors. FIG. 1 shows an example of an existing hard-wired monitoring system wherein sensory devices are connected with wires across an engine or one or more pieces of machinery. Data from the variety of sensory devices is transmitted via the wired connection for transmission and analysis. A hard-wired connection between a sensory device and a source of a timing signal is typically required to generate accurate alignment of signals from a diverse set of instruments.

Although wired systems provide for a high level of precision for synchronization and analysis of collected data, installation of a wired system requires significant time and complexity. Wires and conduits must be installed across machinery or pieces of equipment to connect various sensory devices and must be joined to junction boxes or other devices for collection of the data and subsequent transmission. Further, it may be difficult to locate various sensory devices and other components of the monitoring system to facilitate connection of the sensors or components with other sensors or components on the machinery to be monitored. Difficulty in installing wired monitoring systems is particularly realized on monitoring systems that are installed in the field.

What is needed, therefore, is a system and method of wireless synchronization of machinery monitoring components that allows for precise synchronization and alignment of data wirelessly transmitted from a plurality sensory devices.

SUMMARY

The above and other needs are met by a system and method of wireless synchronization of machinery monitoring components that allows for precise synchronization and alignment of data wirelessly transmitted from a plurality sensory devices. In one aspect, a condition monitoring system for monitoring a condition of a piece of machinery includes: one or more sensor motes installable proximate to a piece of machinery, each of the one or more sensor motes including a housing, a microprocessor, an onboard precision clock in electronic communication with the microprocessor, and an antenna in electronic communication with the microprocessor; one or more sensor devices in wired electronic communication with the microprocessor of one of the one or more sensor motes, the one or more sensor devices in sensory contact with the piece of machinery; a gateway device including a microprocessor and one or more antennas in communication with the microprocessor. When the gateway device is within a wireless range of the one or more sensor motes the gateway device receives time stamped sensor data transmitted to the gateway device from the one or more sensor motes.

In one embodiment, the one or more sensor devices are selected from the group consisting of temperature sensors, pressure sensors, accelerometers, and position sensors. In another embodiment, the piece of machinery is a high-speed engine. The one or more sensor devices are in sensory contact with the high-speed engine.

In yet another embodiment, the gateway device further includes an onboard gateway device precision clock. In one embodiment, the gateway device receives time stamped sensor data from two or more sensor motes and aligns the received sensor data based timestamps associated with the sensor data by the two or more sensor motes.

In another embodiment, the one or more sensor motes further include a power source.

In yet another embodiment, the gateway device is in communication with an off-site server and transmits aligned data from the one or more sensor motes to the off-site server.

In one embodiment, the one or more sensor motes are mounted adjacent a portion of the piece of machinery proximate to the one or more sensor devices in sensory contact with the piece of machinery.

In another embodiment, two or more sensor devices are in wired communication with the sensor mote, and wherein data from the two or more sensor devices is timestamped based on data from the onboard precision clock of the sensor mote in wired communication with the two or more sensor devices.

In yet another embodiment, the monitoring system includes two or more sensor motes, the two or more sensor motes being connected as a mesh network for transmitting timestamped data from the two or more sensor motes to the gateway device.

In one aspect, a condition monitoring system for monitoring a condition of a high speed engine includes: one or more sensor motes installable proximate to the high-speed engine, each of the one or more sensor motes including a housing, a microprocessor, an onboard precision clock in electronic communication with the microprocessor, and an antenna in electronic communication with the microprocessor; one or more sensor devices in wired electronic communication with the microprocessor of one of the one or more sensor motes, the one or more sensor devices in sensory contact with the piece of machinery; a gateway device including a microprocessor and one or more antennas in communication with the microprocessor. When the gateway device is within a wireless range of the one or more sensor motes the gateway device receives time stamped sensor data transmitted to the gateway device from the one or more sensor motes. The one or more sensor devices are selected from the group consisting of temperature sensors, pressure sensors, accelerometers, and position sensors.

In one embodiment, the gateway device receives time stamped sensor data from two or more sensor motes and aligns the received sensor data based timestamps associated with the sensor data by the two or more sensor motes.

In another embodiment, one of the one or more sensor motes receives data from a position sensor detecting a position of a crankshaft of the high-speed engine, wherein data from the one or more sensor motes is aligned with respect to a top dead center position of the high-speed engine.

In yet another embodiment, the condition monitoring system further includes: a first of the one or more sensor motes in wired communication with a plurality of sensor devices in sensory contact with a first portion of the high-speed engine; and a second of the one or more sensor motes in wired communication with a plurality of sensor devices in sensory contact with a second portion of the high speed engine. Data from the first of the one or more sensor motes and the second of the one or more sensor motes is wirelessly received and aligned on the gateway device.

In one embodiment, the gateway device is one of the one or more sensor motes.

In another embodiment, at least 360 points of one of phased-based and sample-based dynamic data are wirelessly transmitted from the sensor mote to the gateway device per cycle of the high-speed engine. In yet another embodiment, from about 1,024 to about 2,048 points of time-based data are wirelessly transmitted from the sensor mote to the gateway device.

In one aspect, a condition monitoring system for monitoring a condition of a piece of machinery includes: one or more sensor motes installable proximate to a piece of machinery, each of the one or more sensor motes including a housing, a microprocessor, an onboard precision clock in electronic communication with the microprocessor, and an antenna in electronic communication with the microprocessor; one or more sensor devices in wired electronic communication with the microprocessor of one of the one or more sensor motes, the one or more sensor devices in sensory contact with the piece of machinery; a gateway device including a microprocessor, an onboard gateway precision clock, and one or more antennas in communication with the microprocessor. When the gateway device is within a wireless range of the one or more sensor motes the gateway device receives time stamped sensor data transmitted to the gateway device from the one or more sensor motes and aligns the received timestamped sensor data on the gateway device with the microprocessor.

In one embodiment, the one or more sensor devices are selected from the group consisting of temperature sensors, pressure sensors, accelerometers, and position sensors.

In another embodiment, the piece of machinery is a high-speed engine, wherein the one or more sensor devices are in sensory contact with the high-speed engine.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
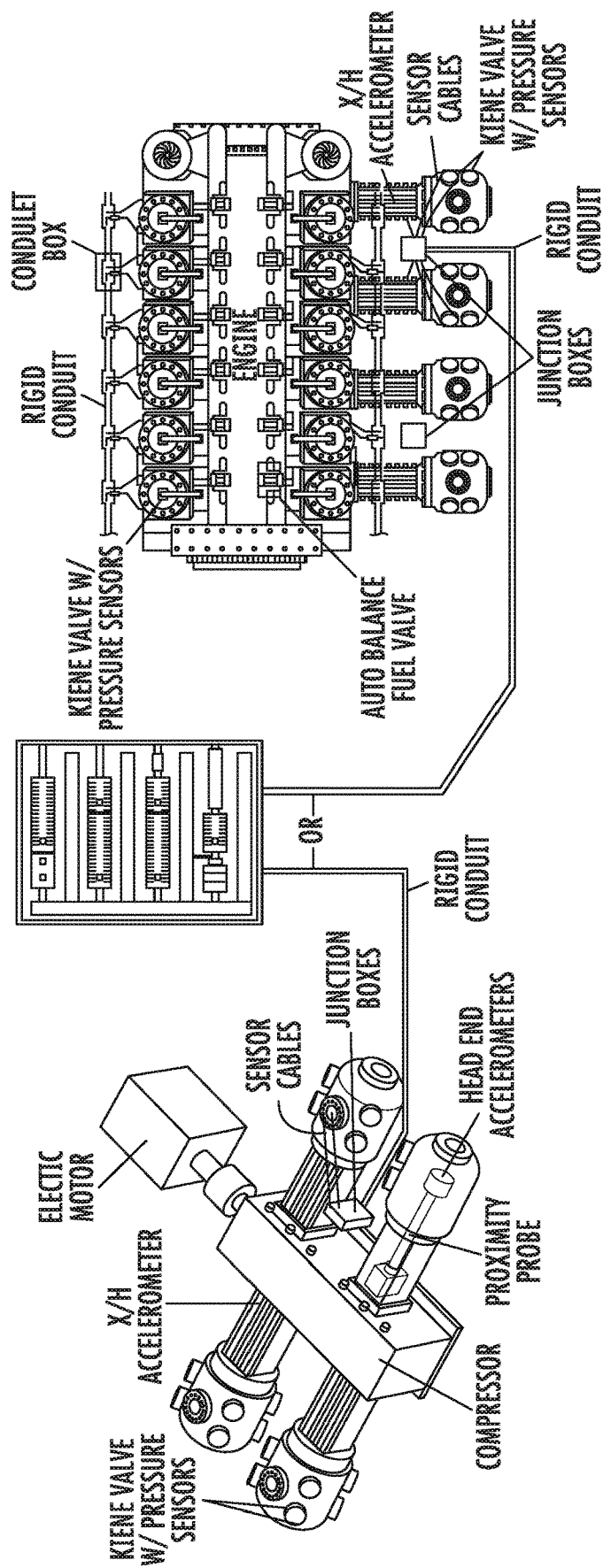
FIG. 1 shows a diagram of a prior art wired machinery monitoring system.
Figure 2:
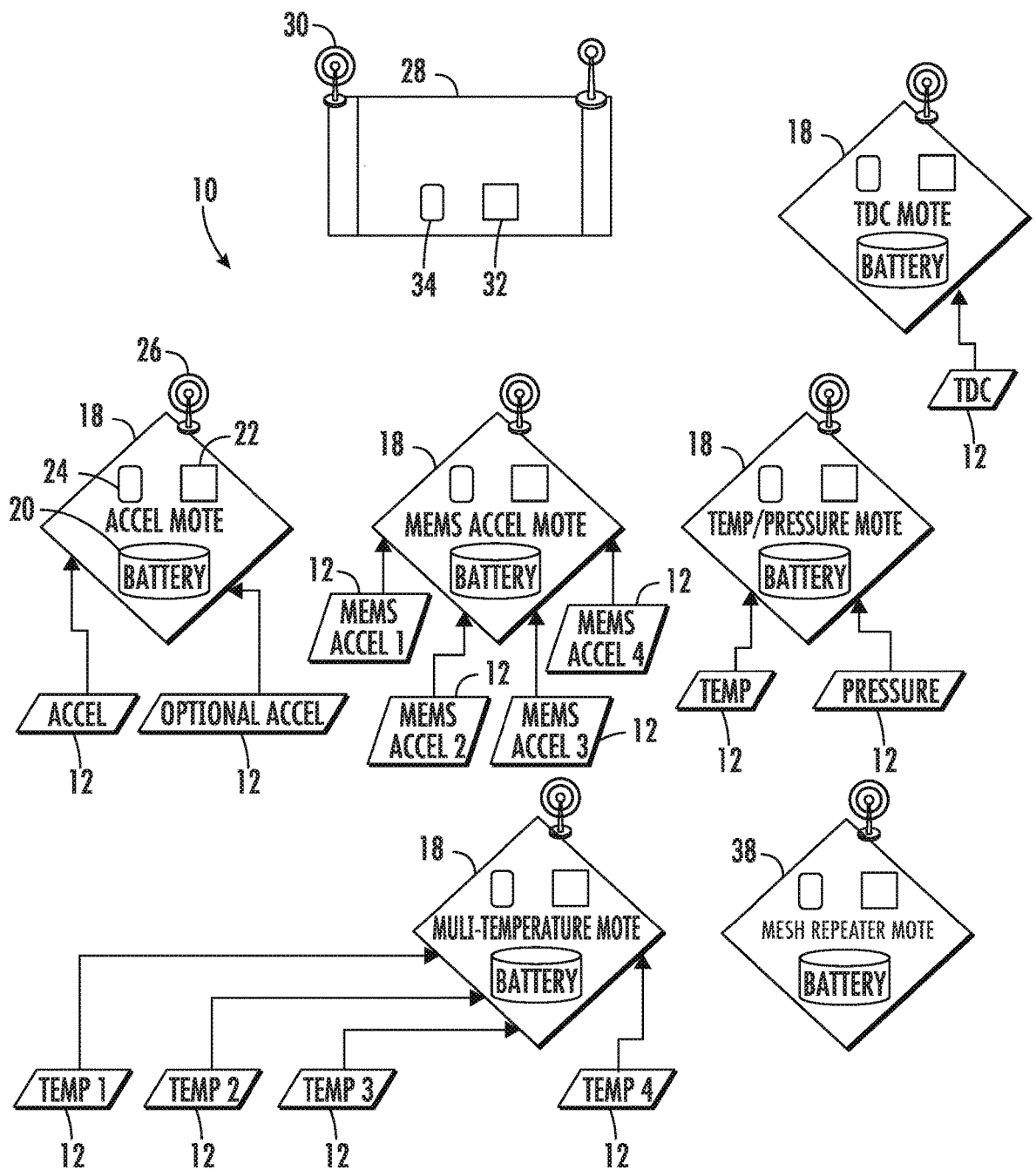
FIG. 2 shows a diagram of a wireless system for monitoring machinery according to one embodiment of the present disclosure.
Figure 3:
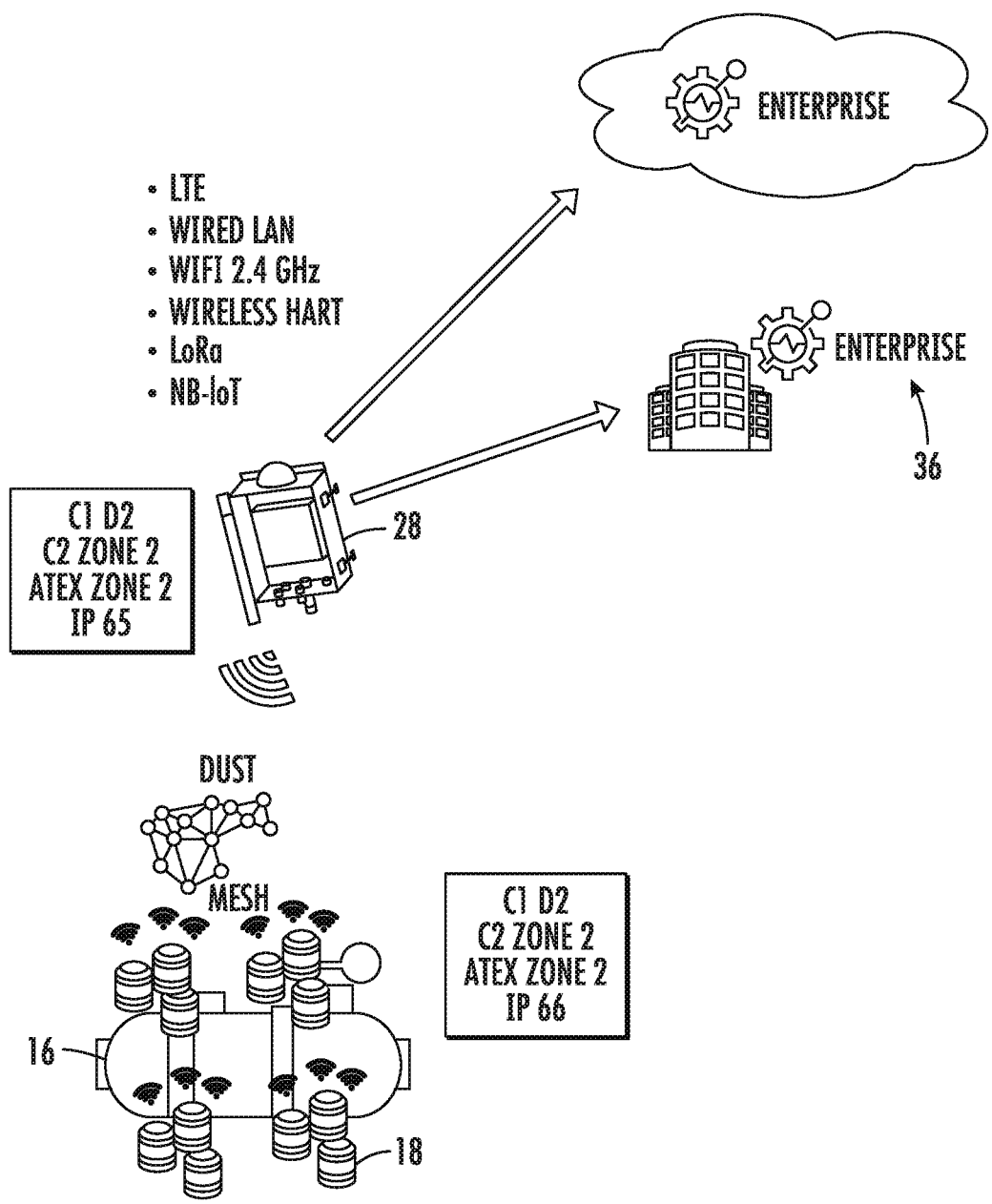
FIGS. 3 and 4 show schematic views of a wireless system for monitoring a high speed engine including a plurality of wireless motes according to one embodiment of the present disclosure.

FIG. 2 shows a basic embodiment of a wireless monitoring system 10. Embodiments of the wireless monitoring system for machinery 10 provide a plurality of sensor devices 12 in wireless communication with at least one gateway 28. Embodiments herein include methods of wirelessly synchronizing the plurality of sensory devices 12, which may be in sensory communication with a high-speed engine 16 (such as is shown in FIG. 3) or one or more other pieces of equipment or machinery for monitoring. As referred to herein, a high-speed engine may include internal combustion engines, compressors, and other reciprocating machinery.

Suitable sensory devices 12 include, for example, one or more accelerometers that may be mounted on the high-speed engine 16. The one or more accelerometers may be mounted on the high-speed engine 16 such that the one or more accelerometers are in sensory contact with the high-speed engine 16 for measuring vibration of the high-speed engine 16, such as at one or more cylinders of the high-speed engine 16. Other suitable sensory devices 12 may further include one or more temperature sensors and pressure sensors mounted in sensory contact with the high-speed engine 16. The one or more temperature sensors and pressure sensors may be configured to capture data related to temperatures and pressures of the high-speed engine 16.

The wireless monitoring system 10 may further include a sensory device that is a shaft angle sensor mounted on the high-speed engine 16. The shaft angle sensor may be mounted such that positions of a cam shaft or crank shaft of the high-speed engine 16 may be measured. For example, the shaft angle sensor may include a magnetic pickup sensor or shaft encoder for monitoring angular position of a crankshaft or cam shaft of the high-speed engine 16. The shaft angle sensor may be configured to determine an angle of the crankshaft or cam shaft of the high-speed engine 16, including positions relative to top dead center ("TDC") of a piston of the high-speed engine 16.

Figure 4:
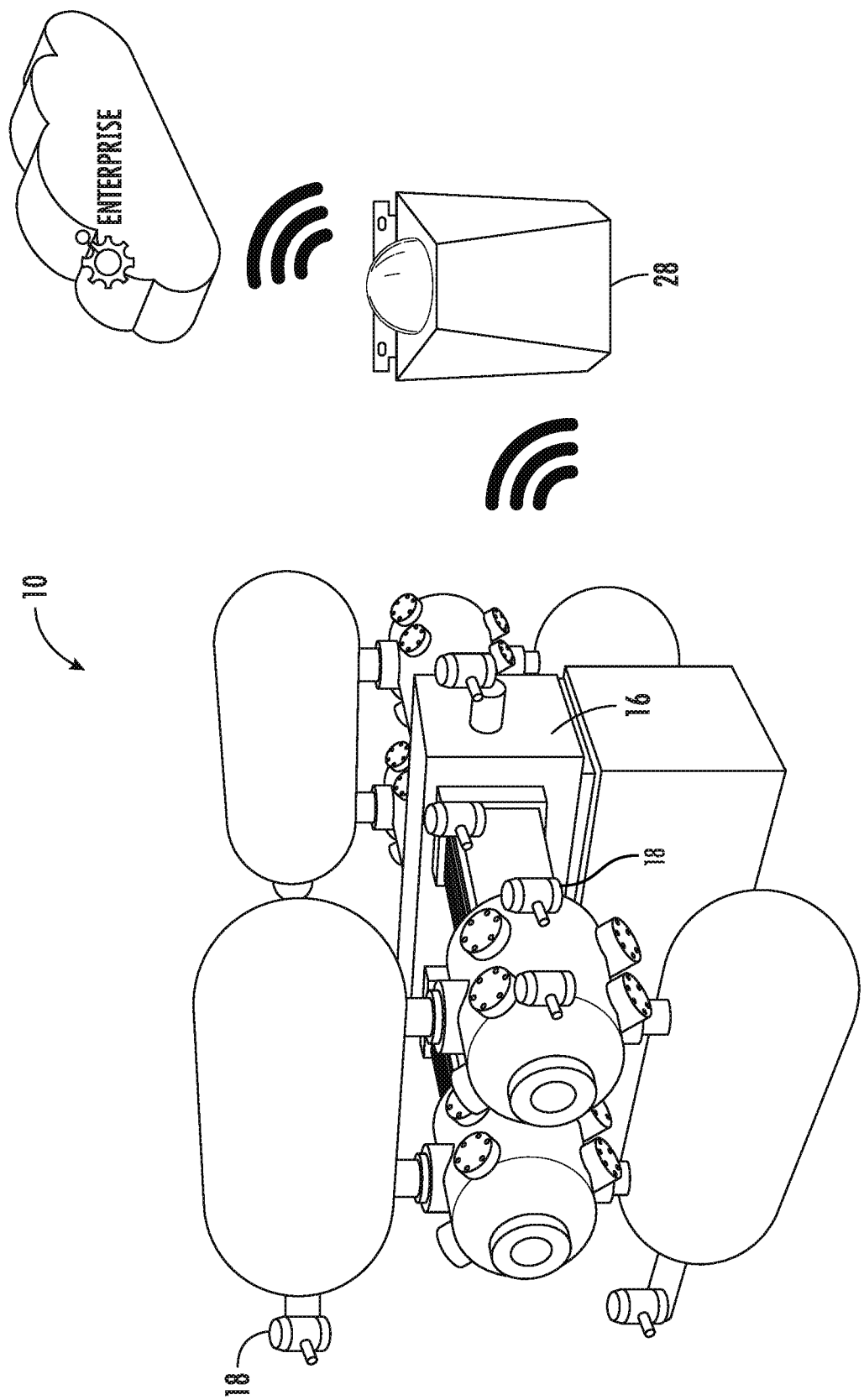
Figure 5:
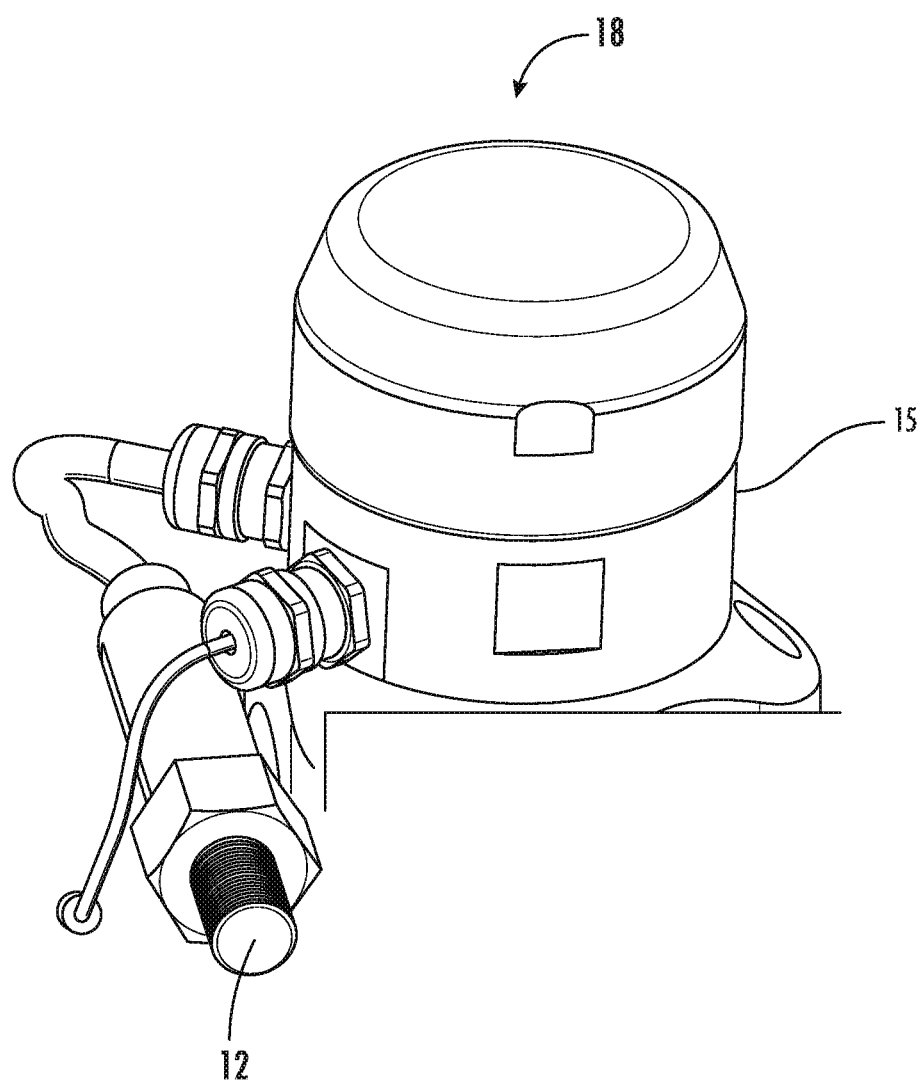
FIG. 5 shows a wireless mote of a wireless system for monitoring machinery according to one embodiment of the present disclosure.

The plurality of sensory devices 12 are in communication with a plurality of sensor motes or nodes 18. As shown in FIG. 2, one or more of the plurality of sensory devices 12 may be in electronic communication with one of the sensor motes 18. One or more of the plurality of sensory devices 12 may be in wired communication with one of the plurality of sensor motes 18 such that data captured on the plurality of sensory devices 12 is transmitted to the motes 18. Groups of the one or more sensory devices 12 may be in communication with one of the sensor motes 18. For example, one or more of the sensory devices 12 that are in physical proximity to each other may be in communication with the same sensor mote 18, such as one or more sensory devices 12 located along a bank of cylinders of the high-speed engine 16. The plurality of sensor motes 18 may be arranged around the high-speed engine 16, as shown in FIG. 4.

Referring again to FIG. 2, each of the plurality of sensor motes or nodes 18 includes a power source 20 (such as a battery), a microprocessor 22, and a mote precision clock 24. The mote precision clock 24 is onboard the mote 18 and may be integrated on the microprocessor 22 or may be a stand-alone component of the mote 18 in communication with the microprocessor 22, such as a high-precision real-time clock chip installed on the mote 18 and in electronic communication with the microprocessor 22. The microprocessor 22 and precision clock 24 are configured to generate time stamp measurements for data captured on the one or more sensors 12 in communication with the mote 18 and associate the generated time stamp measurements with data collected from the one or more sensors 12 in communication with the mote 18. The mote 18 further may include a wireless communication component 26, such as a wireless antenna, such that timestamped data captured on the one or more sensors 12 in communication with the mote 18 may be transmitted wirelessly and such that the mote 18 may wirelessly receive data. The wireless communication components 26 is in communication with the microprocessor 22 onboard the mote 18 such that timestamped measurement data obtained on the mote 18 from the one or more sensory devices 12 is wirelessly transmitted as discussed in greater detail below.

The precision clock 24 is configured to generate time stamp values, such as by generating a time value that may used by the microprocessor 22 to timestamp data from the one or more sensory devices 12 on the sensor mote 18. Each sensor value received from the one or more sensory devices may be associated with a time value from the precision clock 24. The sensor values from the one or more sensory devices may be stored locally on memory of the sensor mote 18 prior to wireless transmission from the sensor mote 18 as discussed in greater detail below.

The microprocessor 22 and mote precision clock 24 are located within a housing 15 of each of the plurality of sensor motes 18. The plurality of sensor motes 18 may further include one or more sensor ports located on the housing 15 for connecting one or more of the plurality of sensor devices 12 to each of the plurality of sensor motes 18. As shown in FIGS. 3 and 4, one or more of the plurality of sensor motes 18 may be located proximate to different portions of the high-speed engine 16 based on sensor devices 12 associated with the sensor mote 18. For example, a first sensor mote may be located proximate to a first portion of the high-speed engine with the first sensor mote including a plurality of sensor devices connected to the sensor mote and in sensory contact with the first portion of the high-speed engine. A second sensor mote may be located proximate to a second portion of the high-speed engine with the second sensor mote including a plurality of sensor devices connected to the sensor mote and in sensory contact with the second portion of the high-speed engine. The first portion of the high-speed engine and the second portion of the high-speed engine may be distal from one another on the high-speed engine and the first sensor mote and second sensor mote may be located without requiring a wired connection between the first sensor mote and the second sensor mote. The plurality of sensor motes 18 may be mounted on or adjacent to portions of the high-speed engine, such as on a base mounted to the high-speed engine or an adjacent surface.

The plurality of motes or nodes 18 may be in wireless communication with a gateway device 28, as shown in FIGS. 2-4. The gateway device 28 may be located on site relative to the high-speed engine 16 and within a wireless transmission range of the plurality of sensor motes or nodes 18. The gateway device 28 may include a gateway wireless communication component 30, such as a wireless antenna, and a microprocessor 32 in communication with the gateway wireless communication component 30. The gateway device 28 may further include a gateway precision clock 34 in communication with the microprocessor 22. The gateway device 28 may be in communication with a cloud hosted server and database 36 for communicating data to and from the cloud hosted server and database 36. The gateway device 28 may be in communication with the cloud hosted server and database 36 over a network. For example, the gateway device 28 may be in wireless communication with the cloud hosted server and database 36 such as by being in wireless cellular communication with the cloud hosted server and database 36. Alternatively, the gateway device 28 may be in wired communication with the cloud hosted server and database 36, such as over a local area network (LAN) or by communicating wirelessly with additional local hardware such as over a WiFi network.

Onboard clocks of the plurality of sensor motes or nodes 18 and the gateway device 28 may be synchronized such that timestamped sensor data collected on the plurality of sensors 12 may be aligned. Synchronization of the clocks of the plurality of motes or nodes 18 and the gateway device 28 may be performed, for example, using various known formats and methods of synchronization. For example, suitable methods or protocols of synchronization may include versions of IEEE1588, deterministic time division protocols (HART/DUST), and other known methods of synchronization.

Figure 6:
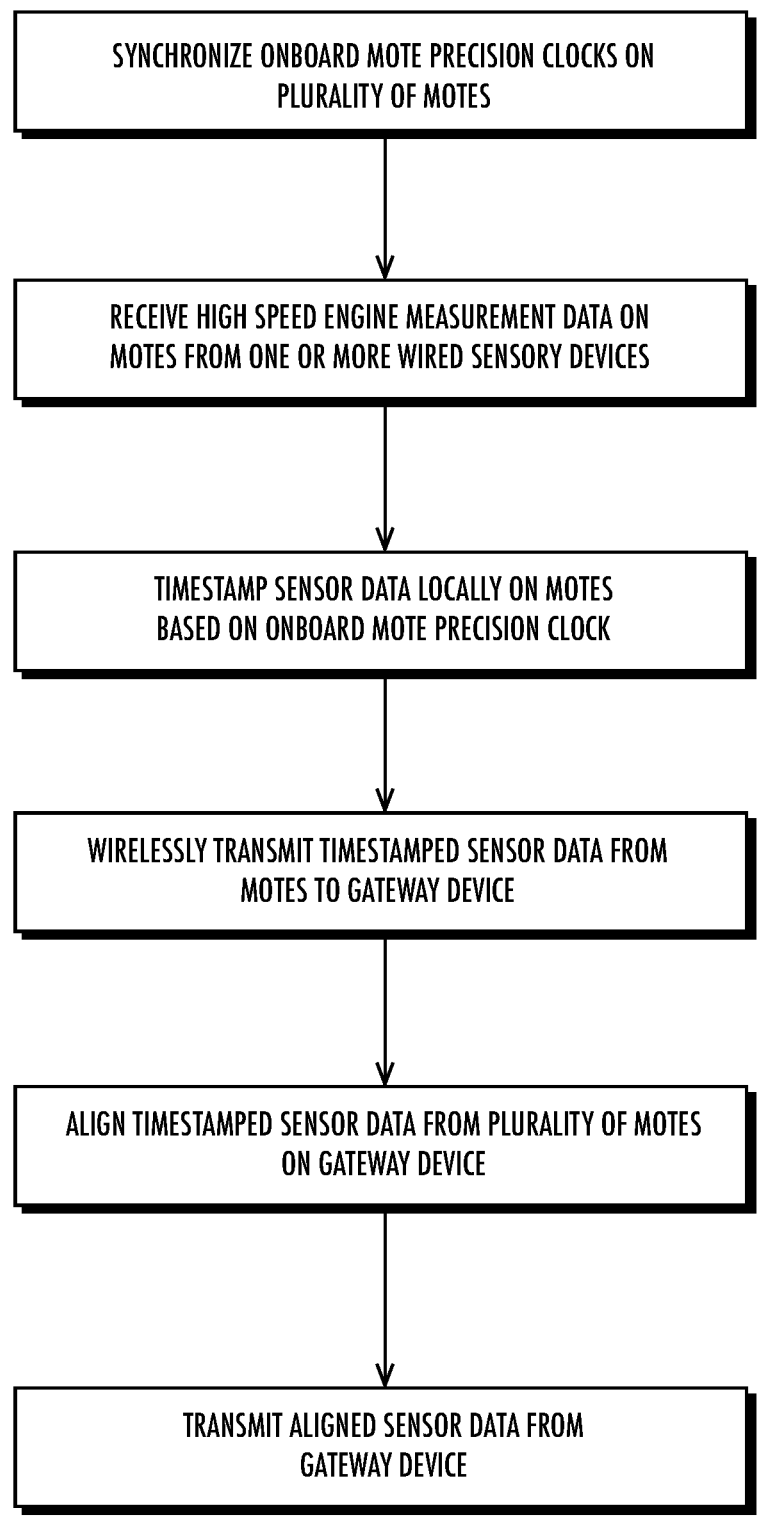
FIG. 6 is a flow diagram of a method of collecting and wirelessly transmitting sensor data from one or more sensor motes according to one embodiment of the present disclosure.

Embodiments herein further include methods of wirelessly synchronization of data from the plurality of sensory devices 12 in sensory contact with the high-speed engine 16. FIG. 6 illustrates a method of wirelessly synchronizing data from the plurality of sensory devices 12 of the wireless monitoring system 10 described herein. Data collected on the plurality of sensory devices 12 is received on at least one of the plurality of sensor motes or nodes 18. Received data may include vibration, temperature, pressure, position, and other data collected by the plurality of sensory devices 12 from the high-speed engine 16. Data received on each of the plurality of sensor motes or nodes 18 is timestamped with respect to the precision clock 24 onboard each of the plurality of motes or nodes 18. Each of the plurality of sensor motes or nodes 18 may received data corresponding to various parameters of the high-speed engine 16. For example, as shown in FIG. 2 each of the plurality of sensor motes 18 may capture data related to operation of the high-speed engine. One of the sensor motes 18 may receive data from one or more accelerometer sensors to measure vibration data, while another of the sensor motes 18 may receive data from one or more temperature sensors to measure temperatures of the high-speed engine.

Timestamped data from the plurality of sensory devices 12 on each of the plurality of sensor motes or nodes 18 is wirelessly transmitted from the mote 18 to the gateway device 28 for alignment. Timestamped data from the plurality of sensory devices 12 that is wirelessly received may be aligned on the gateway device 28 based on the synchronized timestamped data from the plurality of motes or nodes 18. For example, data received from the plurality of sensory devices 12 corresponding to temperature or vibration on the high-speed engine 16 may be aligned with data received from the plurality of sensory devices 12 corresponding to a crank angle or position of a crankshaft of the high-speed engine 16. Data such as temperature and vibration data captured on the plurality of sensory devices 12 may be aligned with phase or shaft angle data. Aligned data on the gateway device 28 may be transmitted, such as wirelessly or through a wired connection, to the cloud hosted server and database 36 for further analysis and monitoring.

In one embodiment, data received on the gateway device 28 from one of the plurality of sensor motes or nodes 18 may be transmitted to others of the plurality of sensor motes or nodes 18 for alignment of data on one or more of the plurality of sensor motes or nodes 18. For example, in one embodiment the gateway device 28 receives timestamped data from a first mote or node corresponding to a position of a crank on the high-speed engine, such as timestamped data corresponding to a top dead center position of the crank. Received timestamped data corresponding to TDC may allow an individual mote or node to align in time data received from the one or more sensors 12 associated with the individual mote or node.

In one embodiment, timestamped data received on the gateway device 28 from the plurality of sensor motes or nodes 18 may be used for diagnostics. For example, timestamped data received on the gateway device 28 from the plurality of sensor motes or nodes 18 may be used to measure network latency between the plurality of sensor motes or nodes 18 and the gateway device 28. In another embodiment, velocity or speed data may be transmitted to the plurality of sensor motes or nodes 18 for digital decimation and sampling data reduction to translate from sample space to time or position space (such as degrees of rotation).

The plurality of sensor motes or nodes 18 may wirelessly communicate with the gateway device 28, such as by communicating directly with the gateway device 28. However, it is also understood that the plurality of sensor motes or nodes 18 may otherwise communicate with the gateway device 28. For example, as shown in FIG. 3, the plurality of sensor motes or nodes 18 and the gateway device 28 may be connected via a mesh network. Additional mesh repeater nodes 38 may be provided to further enable communication between the plurality of sensor motes or nodes 18 and the gateway device 28. In one embodiment, data is received on the device wirelessly, such as from other of the plurality of sensor motes or nodes 18 or the gateway device 28 for further analysis and calculations of data collected on the sensor mote 18.

The plurality of sensor motes or nodes 18 may be battery-powered wireless devices capable of onboard accumulation of phase based or waveform data and calculations performed onboard each of the plurality of sensor motes or nodes 18. Various onboard functions may be carried out by the microprocessor locally on the plurality of sensor motes or nodes 18 including digital filtering, decimation, and wireless transmission of precision static and dynamic data with a high frequency bandwidth. For example, in one embodiment at least 360 points of phased-based or sample-based dynamic data are transmitted from the mote 18 per cycle of the high-speed engine, or from about 1,024 to about 2,048 points of time-based data. Calculated results on the mote are transmitted to the gateway device 28 for further analysis or transmission. For example, pressure and vibration waveforms may be sampled and converted to time frequency response, or position space from wireless data received on the mote.

The mote or node 18 may include a plurality of sensor inputs such that the mote or node 18 is capable of capturing data through a plurality of sensors connected to the mote 18. For example, the mote or node 18 may include one or more temperature sensors, accelerometers, pressure transducers, ultrasonic sensors, proximity sensors, and other various sensors connected to the mote or node 18 and in sensory contact with the high-speed engine 16 for collecting data from the high-speed engine 16. The mote or node 18 may be preconfigured with various arrangements of sensors, or alternatively may be provided such that a plurality of sensors may be selectively connected to the mote 18 depending on desired data to be collected on the mote or node 18.

In one embodiment, when the mote or node 18 is battery powered, the mote or node 18 is capable of conserving energy and harvesting energy, such as from the high-speed engine 16. The mote or node 18 may include various onboard energy management capabilities. For example, battery voltage may be monitored and compensation made for equivalent internal battery series resistance (ESR), current draw, and temperature. Further, energy may be harvested from a surrounding environment of the mote or node 18. For example, energy may be harvested from a magnetic pickup circuit, such as from rotating components of the high-speed engine 16. In another example, energy may be harvested on the mote or node 18 from a piezoelectric crystal, radio signals, or a thermopile or other heat-difference energy harvesting device connected to the mote or node 18. Onboard capabilities of the mote or node 18 may further include placing the mote or node 18 in sleep, doze, and low energy modes for conserving onboard energy. In another embodiment, energy draw from the battery may be boosted when additional energy is required by the mote or node 18.

In another embodiment, the mote or node 18 may include a near field communication chip located onboard the mote or node 18 to facilitate the establishment of a connection between the plurality of motes or nodes or node 18 and the gateway device 28. For example, a mote may be added to wireless monitoring system for monitoring machinery 10 using a "tap-to-pair" method. A user device, such as a smart phone or other similar device, may be used to facilitate establishing a connection between the mote or node 18 and the wireless system for monitoring machinery 10. The mote or node 18 may use near field communication as an out of band authentication to secure a connection of the mote or node 18 to the wireless system for monitoring machinery 10, thereby allowing ready establishment of communication between the mote or node 18 and other components of the wireless system for monitoring machinery 10.

Advantages of the monitoring system disclosed herein include advantageously enabling precise measurement of parameters of a piece of machinery, such as a high-speed engine, while allowing components of the monitoring system to communicate wirelessly, thereby reducing difficulties associated with installation of components of the monitoring system on the piece of machinery. For example, sensor motes may be installed locally on the piece of machinery in proximity to one or more sensor devices in wired communication with the sensor mote. Sensor devices may be placed, for example, along a cylinder bank of a high-speed engine. One sensor mote may be in wired communication with sensors along the cylinder bank of the high-speed engine. Another sensor mote may be located proximate to and in wired communication a sensor that is located proximate to a crank shaft of the high-speed engine. Timestamped data from each sensor mote may subsequently be wirelessly transmitted, such as to the gateway device, for subsequent alignment and analysis. Therefore, multiple sensor motes may be located at different locations around a piece of machinery without requiring the sensor motes to be in wired communication with one another or a gateway device while still allowing the accumulation of precise data that may be aligned and analyzed to monitor an operating condition of the piece of machinery. This reduces the complexity and difficulty in installing sensors around an existing piece of machinery and further allows for remote analysis and monitoring of a condition of the machinery without requiring significant additional on-site resources located near the machinery.

Further, at least partial processing of sensor data may be achieved locally on sensor motes of the monitoring system prior to transmission of acquired data wirelessly for alignment with data from other sensors and subsequent analysis, thereby improving the acquisition of data by the sensors while still allowing for data to be wirelessly transmitted between devices of the monitoring system. Further advantages include enabling diagnostics of components of the monitoring system, such as measurement of latency between wireless components of the monitoring system.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A condition monitoring system for monitoring a condition of a high-speed reciprocating engine, the condition monitoring system comprising:
   two or more sensor motes installable proximate to a high-speed reciprocating engine, each of the two or more sensor motes including:
      a housing,
      a microprocessor,
      an onboard precision clock in electronic communication with the microprocessor, and
      an antenna in electronic communication with the microprocessor;
   two or more sensor devices each in wired electronic communication with the microprocessor of a different one of the two or more sensor motes, the two or more sensor devices in sensory contact with the high-speed reciprocating engine, wherein one of the two or more sensor devices comprises a position sensor that detects a position of a crankshaft of the high-speed reciprocating engine relative to a top dead center position;
   a gateway device including a microprocessor and one or more antennas in communication with the microprocessor of the gateway device, wherein when the gateway device is within a wireless range of the two or more sensor motes, the gateway device receives time stamped sensor data transmitted to the gateway device from the two or more sensor motes, wherein the gateway device uses the time stamped sensor data to measure network latency between the sensor motes and the gateway device, wherein the gateway device aligns the received time stamped sensor data of the two or more sensor motes based on the measured network latency of each of the two or more sensor motes.

2. The condition monitoring system of claim 1, wherein another of the two or more sensor devices are selected from the group consisting of temperature sensors, pressure sensors, and accelerometers.

3. The condition monitoring system of claim 1, the gateway device further comprising an onboard gateway device precision clock.

4. The condition monitoring system of claim 1, the two or more sensor motes further comprising a power source.

5. The condition monitoring system of claim 1, wherein the gateway device is in communication with an off-site server and transmits aligned data from the two or more sensor motes to the off-site server.

6. The condition monitoring system of claim 1, wherein the two or more sensor motes are mounted adjacent a portion of the high-speed reciprocating engine proximate to the two or more sensor devices in sensory contact with the high-speed reciprocating engine.

7. The condition monitoring system of claim 1, wherein data from the two or more sensor devices is timestamped based on data from the onboard precision clock of the respective sensor mote in wired communication with the two or more sensor devices.

8. The condition monitoring system of claim 1, wherein the two or more sensor motes are connected as a mesh network for transmitting timestamped data from the two or more sensor motes to the gateway device.

9. A condition monitoring system for monitoring a condition of a high-speed reciprocating engine, the condition monitoring system comprising:
   two or more sensor motes installable proximate to the high-speed reciprocating engine, each of the two or more sensor motes including:
      a housing,
      a microprocessor,
      an onboard precision clock in electronic communication with the microprocessor, and
      an antenna in electronic communication with the microprocessor;
   two or more sensor devices each in wired electronic communication with the microprocessor of a different one of the two or more sensor motes, the two or more sensor devices in sensory contact with the high-speed reciprocating engine, wherein a first of the two or more sensor devices comprises a position sensor that detects a position of a crankshaft of the high-speed reciprocating engine relative to a top dead center position;
   a gateway device including a microprocessor and one or more antennas in communication with the microprocessor of the gateway device, wherein when the gateway device is within a wireless range of the two or more sensor motes, wherein the gateway device receives time stamped sensor data transmitted to the gateway device from the two or more sensor motes, wherein the gateway device uses the time stamped sensor data to measure network latency between the sensor motes and the gateway device, wherein the gateway device aligns the received time stamped sensor data of the two or more sensor motes based on the measured network latency of each of the two or more sensor motes;

wherein a second of the two or more sensor devices is selected from the group consisting of temperature sensors, pressure sensors, and accelerometers.

10. The condition monitoring system of claim 9, further comprising:
the first of the two or more sensor motes in wired communication with a plurality of sensor devices in sensory contact with a first portion of the high-speed reciprocating engine, wherein the first of the two or more sensor motes includes the position sensor; and
the second of the two or more sensor motes in wired communication with a plurality of sensor devices in sensory contact with a second portion of the high-speed reciprocating engine;

wherein data from the first of the two or more sensor motes and the second of the two or more sensor motes is wirelessly received and aligned on the gateway device.

11. The condition monitoring system of claim 9, wherein the gateway device comprises one of the two or more sensor motes.

12. The condition monitoring system of claim 9, wherein at least 360 points of one of phased-based and sample-based dynamic data are wirelessly transmitted from at least one of the two or more sensor motes to the gateway device per cycle of the high-speed reciprocating engine.

13. The condition monitoring system of claim 9, wherein from about 1,024 to about 2,048 points of time-based data are wirelessly transmitted from at least one of the two or more sensor motes to the gateway device.

\* \* \* \* \*